Feb. 24, 1942.  H. A. HOKE  2,274,545
BUILT-UP WHEEL
Filed May 3, 1940  3 Sheets-Sheet 1
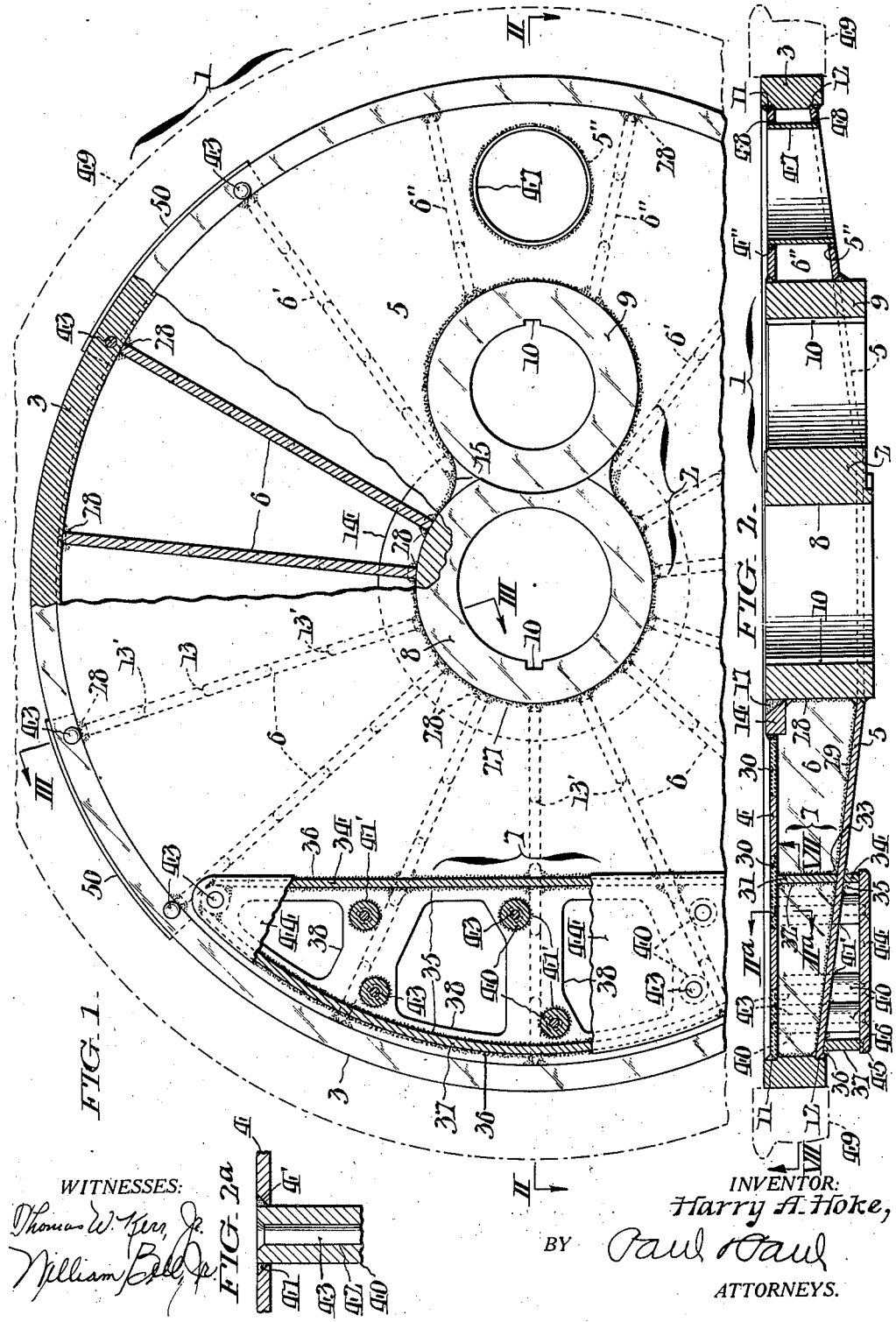
WITNESSES:
INVENTOR:
Harry A. Hoke,
BY
ATTORNEYS.

Feb. 24, 1942. H. A. HOKE 2,274,545
BUILT-UP WHEEL
Filed May 3, 1940 3 Sheets-Sheet 2
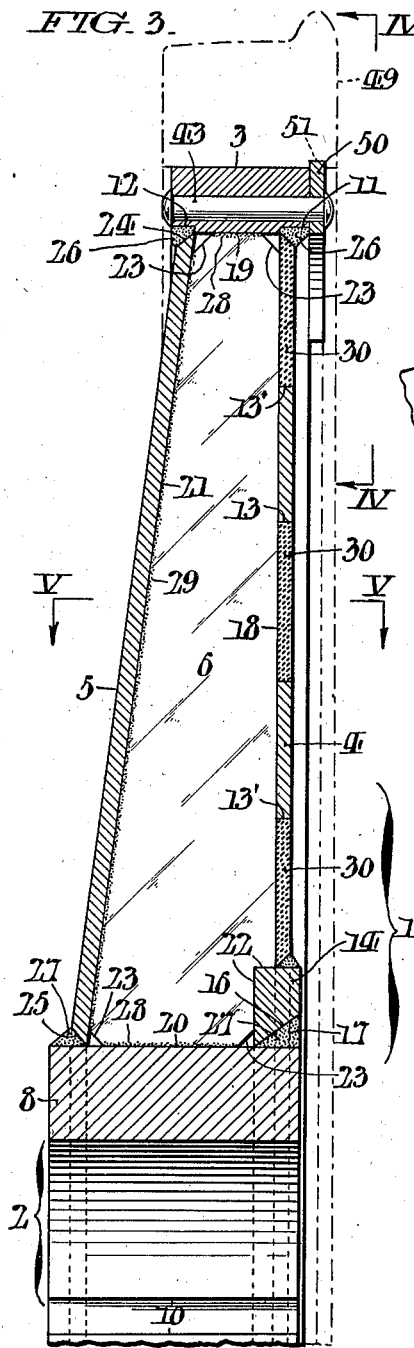
INVENTOR:
Harry A. Hoke,
BY Paul & Paul
ATTORNEYS.

Feb. 24, 1942. H. A. HOKE 2,274,545
BUILT-UP WHEEL
Filed May 3, 1940 3 Sheets-Sheet 3

WITNESSES:
Thomas W. Kerr Jr.
William Bell Jr.

INVENTOR:
Harry A. Hoke,
BY Paul & Paul
ATTORNEYS.

Patented Feb. 24, 1942

2,274,545

UNITED STATES PATENT OFFICE 2,274,545

BUILT-UP WHEEL

Harry A. Hoke, Altoona, Pa., assignor to The Pennsylvania Railroad Company, Philadelphia, Pa., a corporation of Pennsylvania Application May 3, 1940, Serial No. 333,095

1 Claim. (Cl. 295—8)

This invention has general reference to built-up wheels and, more particularly, to locomotive and railroad car wheels of the species comprising a combined axle and crank pin center, and a rim supporting and load carrying flanges connected to said center, with or without a counterbalance pocket preferably exterior of one of the flanges, and all of said parts welded together to form a composite wheel.

Wheels of the above referred to character frequently cause considerable trouble owing to the development of shrinkage cracks in the combined axle and crank pin center when made of cast steel, and the primary object of this invention is to overcome such objectionable features by providing a composite wheel in which the hub and crank pin center as well as the rim are preferably fabricated from hard annealed steel, while the associated flange and spacer webs are made of a soft steel of a specific composition commonly known in the art as flange steel.

Another object is the provision of a built-up wheel in which all of the components, with the exception of the center and rim, are made of a softer steel than said center and rim, such softer steel being better suited to resist repeated shocks and loads.

A further object is to provide a drive wheel which is lighter in construction and cheaper to produce than heretofore, that will effectively resist the radial and lateral shocks and loads to which such wheels are subjected, and in which the spacer and other components connecting the center and rim together as well as to one another are so located as to ensure maximum strength while increasing the service life of the wheel over analogous known types thereof.

Other objects with ancillary advantages of this invention will appear, as the nature thereof is better understood, said invention consisting substantially in the novel features of construction, arrangements and co-relation of parts, herein fully disclosed, illustrated by the accompanying drawings, wherein similar reference characters are used to designate corresponding parts throughout the several views, and then finally pointed out and specifically defined in the concluding claim.

In the drawings:

Fig. 1 is a broken side elevation of a drive wheel in accordance with this invention and having fragmentary portions removed or in section to better disclose important details.

Fig. 2 is a diametric cross-section, taken approximately as indicated by the arrows II—II in the preceding figure.

Fig. 2a is a local section, taken as indicated by the arrows IIa—IIa in Fig. 2.

Fig. 3 is a radial cross-section, taken on the plane III—III of Fig. 1.

Fig. 4 is a fragmentary sectoral elevation approximately as viewed within the confines of the arrows IV—IV in the preceding figure.

Fig. 5 is a cross-section on the plane V—V of Fig. 3.

Figure 6:
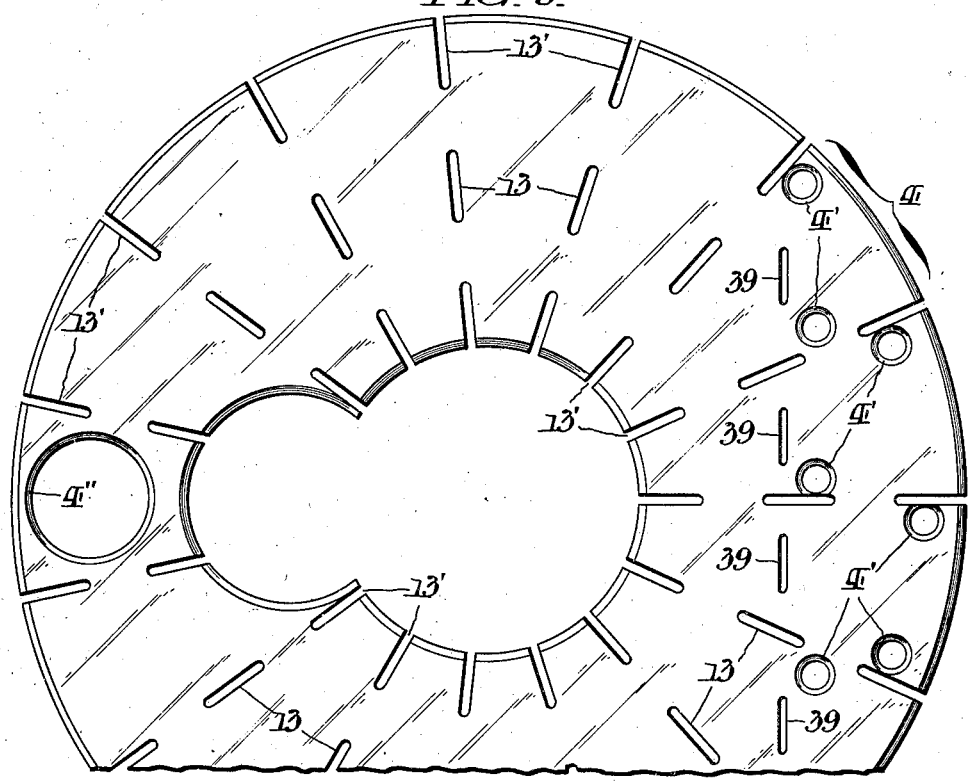
Fig. 6 is a broken face view of one of the wheel forming plate discs hereinafter more fully described.

In the following detailed description of the embodiments of this invention, shown by the accompanying three sheets of drawings, specific terms will be employed for the sake of clarity; but it is to be understood that such terms are used in a descriptive sense and not for purposes of limitation. Each specific term employed herein is intended to embrace all technical equivalents which are susceptible of analogous interpretation.

Referring more in detail to the drawings which illustrate the instant improvements as incorporated in one form of locomotive drive wheels, reference is had to Figs. 1-7, wherein the wheel is comprehensively designated by the reference character 1. The wheel 1, it will be seen, generally comprises a composite axle and crank-pin center 2; a rim 3; inner and outer or back and front discs 4, 5, respectively; radial spacers 6, and a laterally enlarged counterbalance 7.

The composite center 2 embodies an axle hub portion 8 with an eccentrically related or crank-pin hub portion 9, each provided with a key-way 10, and said center is preferably made in one piece of what is known in the art as hard annealed steel of proper texture and strength for this part of the wheel 1, having the axle and crank pin hubs integral therewith. The rim 3 is also made of the same type of hard annealed steel, rectangular in cross-section, and formed with back and front inner groovings 11, 12, respectively, for purposes later on set forth. The back 4 of the wheel 1 is preferably formed as a plate disc from "softer" grade or what is known as flange steel, while the front 5 is of corresponding flange steel but dished or of coniform section. At this juncture it is to be particularly remarked that one of the discs 4, 5, preferably the former, is provided with a number of radially-directed elongate slots 13, best shown in Fig. 6, conveniently, although not essentially, arranged in aligned circumferential and equally-spaced series, each series including outer and inner open-end slots 13' respectively adjoining the rim 3 and composite center 2 with the intervening slot 13 medially between said rim and center, and all of such slots 13, 13' serve for a purpose hereinafter explained. Attention is also directed to the provision of the composite center 2 with an applied flange or collar 14, preferably of corresponding hard annealed steel, said collar extending around the center axle-hub portion 8 into the reduced body portion 15, between said axle-hub and the crank-pin hub portion 9, and having the inner arcual surface beveled at 16 for subsequent filling with suitable welding material 17, whereby the collar 14 is permanently united to the center 2.

Between the back and front discs 4, 5, respectively, are arranged the spacers 6, in number corresponding with the series of aligned slots 13 above referred to, it being noticeable from the right-hand part of Fig. 1 that the spacers 6' and 6" are appropriately shortened for abutment at their inner ends against the confronting wall portions of the center body 15, and the crank-pin hub 9, so as to radially align with the axis of the axle-hub 8. In addition, it is to be noted the respective spacers 6 each embody a straight back edge 18 with rectangularly related outer and inner ends 19, 20, respectively, as well as an inclined front edge 21, with the back edge 18 inwardly stepped at 22 for abutment against the center flange 14, while the majority of the angular corners are cut away as indicated at 23. It will thus be apparent, and best appreciated from Fig. 3, that each spacer edge 18 abuts the wheel back disc 4, while the inclined edge 21 similarly engages the inner face of the coned disc 5; whereas the ends 19, 20 transversely abut the inner surface of the rim 3 and the outer curvilinear face of the center 2; while both of the discs 4, 5 preferably have their circumferential edges reversely beveled to define outer and inner angle-section surrounding recesses 24, 25, with respect to opposing rim groovings 11, 12 and the curvilinear outer face of the composite center 2.

In constructing the wheel 1 from the parts thus far described, either of the plate discs 4, 5, for example the latter, is initially centralized with respect to the rim 3 and composite center 2, when the disc surrounding recesses 24, 25 are filled by suitable consolidating material to form buttress welds 26, 27, respectively, of substantially triangular cross-section. These welds 26, 27, it will be remarked, by virtue of their cross-section, not only integrally unite the disc 5 to the composite center 2 and rim 3, but, in conjunction with the bevel edges of said disc, constitute homogeneous buttress junctures positively effective to prevent any outward rupture, or bulging, of the disc thereat under normal loading and operating shocks. The several radial spacers 6, 6' and 6" are next radially placed intermediate the rim 3 and composite center 2 with their inclined edges 21 in abutment with the disc 5, whereupon their end edges 19, 20 are permanently connected by line welds 28 to the rim 3 and center 2, as well as similar welds 29 to the disc 5. The other disc 4 is next applied with its radial slots 13, 13' directly over the pre-arranged and secured spacers 6, 6' and 6", when suitable welding material 30 is filled into said slots, so as to rigidly hold the plate disc 4 and the spacers 6, 6' and 6" securely together, the slots 13 being entirely filled with such welding material, while the weld filling of the outer and inner slots 13' respectively unite with the wheel concentric welds 26, 27 in an obvious manner.

Figure 7:
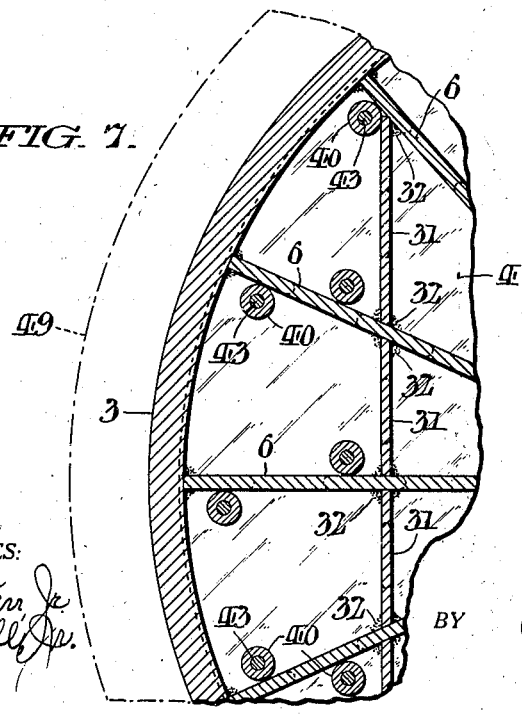
Fig. 7 is a detail section, taken approximately as indicated by the plane indicating arrows VII—VII in Fig. 2, and drawn to a larger scale for clearer illustration.

Wheels 1 of the foregoing described type are customarily provided with a counterbalance 7 in opposition to the crank-pin hub 9, and, in accordance with this invention, said counterbalance is preferably defined by aligned flange steel chord pieces 31 fitted between the selected spacers 6 to give the requisite pocket capacity to the counterbalance 7, said chord pieces being rigidly secured in place by end welds 32, Fig. 7, uniting them to the associated spacers 6, and line welds 33, Fig. 2, similarly joining them to the plate disc 5. In addition, the registering chord portion 34, Figs. 1 and 2, of an exterior and continuous supplemental pocket-defining flange-steel segmental-rim is secured by inner and outer surrounding welds 35, 36, respectively, to the plate disc 5, it being noted that the arcual portion 37 of said rim is contoured concentric with the axis of rotation of the wheel 1, slightly within the confines of the outer beveled circumferential edge of said disc, as readily understood from said figures. Appropriate openings 38 are also provided in the plate disc 5 intermediate the spacers 6 to provide free communication between the wheel and supplemental hollows of the counterbalance 7, while elongate slots 39, Fig. 6, are provided in the plate disc 4 for registration with the chord pieces 31, for a purpose hereafter explained.

Reinforcing ferrules 40 are united to the respective plate discs 4, 5 by surrounding end welds 41, Fig. 2a, filled into outward flarings 4', Fig. 6, in the plate disc 14 with similar welds 41' around such ferrules where they pass through plain holes in the plate disc 5; said ferrules being engaged through holes 42 in both discs 4, 5, and serving for passage of rivets 43. The slots 39 are filled with welding material 30 as explained in connection with the radial slots 13 for a like purpose.

After the parts described in the preceding paragraph are assembled and united by the welds 32, 33, 35, 36, 41 and 41', the counterbalance hollows set apart, as set forth, are filled with lead, when the rim portion 34, 37, or supplemental hollow, is closed-in by a flange steel cover-plate 44 which is secured in position by the rivets 43, aforesaid, in an obvious manner. Prior to filling the counterbalance hollows with lead, or the like, and before the cover plate 44 is applied and the finishing cuts taken-off, the wheel 1 is placed in a suitable oven and thoroughly annealed; while the counterbalance rim 34, 37 may be provided with one, or more, dowel-like projections 45 at appropriate locations for engagement in complemental holes 46 in said cover plate 44. Opposing the counterbalance 7, the wheel 1 is conveniently provided with a tubular fitting 47 intermediate the plate discs 4, 5, and permanently united thereto by exterior welds 48 filled-in outwardly-flared concentric openings 4" and 5" in said discs. This fitting 47 affords space whereby a knuckle or cross-head pin may be backed therethrough when it is desired to move one or more elements of the driving means associated therewith.

In order to attach the tire 49, indicated by dot-and-dash outline in Figs. 1–4, to the wheel rim 3, the latter is provided at circumferentially spaced intervals, of selected extent, with arcual strips or key members 50 conveniently secured in place by adjoining rivets 43 in the center lines of the spacers 6, said members being arranged to project beyond the circumferential surface of the rim 3 for key engagement in complemental grooves 51 provided for their reception in the tire 49.

It is further desired to stress the fact that, with the built-up wheel 1, all casting shrinkage cracks are avoided, inasmuch as no cast metal is employed; the entire wheel 1, with the exception of the rim 3 and composite center 2, being made of softer steel, said wheel is better suited to resist repeated shocks and loads applied both radially and laterally in service. The material or parts which form the connection between the center 2 and rim 3 are placed in the best position to resist the loads transmitted between the rail and the axle without bending the plate discs 4, 5; and, finally, the wheel herein disclosed is considerably lighter in weight and cheaper to produce than cast steel corresponding wheels.

While for purposes of properly disclosing the invention a practical embodiment thereof has been explained in detail, it is to be understood the same is to be considered in an illustrative sense, and said invention is not to be limited thereto except as may be specifically construed from the following claim.

Having thus described my invention, I claim:

A built-up wheel comprising a hard annealed steel composite center of selected texture and strength, said center embodying axle and crank-pin hub portions, an attached substantial collar about the axle hub portion; a rim of like material having inner groovings; back and front plate discs of different texture and softer steel intermediate the center and rim, said discs having their inner and outer circumferential edges reversely beveled to define with the rim groovings, hub collar and crank-pin hub surrounding angle section recesses, one of said discs having radially directed spaced series of elongate slots therethrough, with the inner and outer ones open-ended for communication into said recesses; spacers of the softer steel in connected abutment between the plate discs, composite center and rim, each spacer having one longitudinal edge lapping a confronting radial series of elongate slots; a counterbalance main pocket defined by chord pieces intermediate selected wheel disc spacers; aligned elongate slots in one of the wheel discs over which said chord pieces register; a rim member exterior of the disc opposing the radially slotted one to define a supplemental pocket, said rim member including a chord portion aligned with the aforementioned chord pieces, and an arcual portion inward of the wheel rim; apertures through the second mentioned disc affording substantial communication between the counterbalance main and supplemental pockets; means integrally connecting the parts aforesaid to the wheel discs and spacers; welding material filling all of the disc radial and chord piece slots with the open-ended ones united to the disc surrounding welds to rigidify the wheel as a built-up unit; and a cover member for the counterbalance supplemental pocket.

HARRY A. HOKE.